(12) United States Patent
Chen

(10) Patent No.: US 8,196,995 B2
(45) Date of Patent: Jun. 12, 2012

(54) SLIDING DIVERSION APPARATUS FOR REDUCING DRAG OF VEHICLE

(75) Inventor: Shih-Hsiung Chen, Yongkang (TW)

(73) Assignee: Thermaflow Energy Technology, Inc., Tainan County (TW)

( * ) Notice: Subject to any disclaimer, the term of this patent is extended or adjusted under 35 U.S.C. 154(b) by 355 days.

(21) Appl. No.: 12/605,639

(22) Filed: Oct. 26, 2009

(65) Prior Publication Data

US 2011/0095566 A1    Apr. 28, 2011

(51) Int. Cl.
*B62D 35/00* (2006.01)
(52) U.S. Cl. ................ 296/180.4; 180/903
(58) Field of Classification Search ............ 105/1.1, 105/1.2, 1.3; 180/903; 296/180.1, 180.2, 296/180.3, 180.4, 180.5
See application file for complete search history.

(56) References Cited

U.S. PATENT DOCUMENTS

| | | | | |
|---|---|---|---|---|
| 3,010,754 A * | 11/1961 | Shumaker | ................... | 296/91 |
| 3,276,811 A * | 10/1966 | Schmidt | ................... | 296/91 |
| 3,822,910 A * | 7/1974 | Wiley, Jr. | ................... | 296/180.3 |
| 4,320,920 A * | 3/1982 | Goudey | ................... | 296/180.4 |
| 4,518,188 A * | 5/1985 | Witten | ................... | 296/180.2 |
| 4,818,015 A * | 4/1989 | Scanlon | ................... | 296/180.1 |
| 5,058,945 A * | 10/1991 | Elliott et al. | ................... | 296/180.5 |
| 6,467,833 B1 * | 10/2002 | Travers | ................... | 296/180.4 |
| 6,854,788 B1 * | 2/2005 | Graham | ................... | 296/180.4 |
| 7,192,077 B1 * | 3/2007 | Hilleman | ................... | 296/180.1 |
| 7,207,620 B2 * | 4/2007 | Cosgrove et al. | ................... | 296/180.4 |
| 7,484,791 B1 * | 2/2009 | Chen | ................... | 296/180.5 |
| 7,537,270 B2 * | 5/2009 | O'Grady | ................... | 296/180.4 |
| 7,641,262 B2 * | 1/2010 | Nusbaum | ................... | 296/180.5 |
| 7,854,468 B2 * | 12/2010 | Vogel et al. | ................... | 296/180.1 |
| 2003/0205913 A1 * | 11/2003 | Leonard | ................... | 296/180.4 |
| 2008/0157560 A1 * | 7/2008 | Spector | ................... | 296/180.4 |

FOREIGN PATENT DOCUMENTS

TW            M329580            4/2008

* cited by examiner

*Primary Examiner* — Glenn Dayoan
*Assistant Examiner* — Paul Chenevert
(74) *Attorney, Agent, or Firm* — Chun-Ming Shih; HDLS IPR Services

(57) ABSTRACT

A diversion apparatus, adapted to be arranged at the tail end of a vehicle, includes a diversion assembly and a slide mechanism. The inside of the diversion assembly is hollow and formed an airflow channel. The slide mechanism is arranged fixedly at the tail end of the vehicle body and has slot tracks extended along the lengthwise direction of the tail end of the vehicle body. The diversion assembly arranged on the slot tracks can be moved and slid thereon. Therefore, the diversion assembly can be slid on the slot tracks and moved toward the front of the vehicle body to prevent the opening of the door leaf of the vehicle from being hindered by the diversion assembly.

7 Claims, 7 Drawing Sheets

SLIDING DIVERSION APPARATUS FOR REDUCING DRAG OF VEHICLE

BACKGROUND OF THE INVENTION

1. Field of the Invention

The present invention in general relates to a diversion apparatus of vehicle, in particular, to a slippage-typed diversion apparatus for reducing the drag of a running vehicle.

2. Description of Prior Art

Accordingly, as disclosed in a new-typed patent titled as "Diversion Structure Capable of Reducing Drag" in Taiwan Patent Publication No. M329580, a diversion structure, which is adapted by being arranged at the tail end of a vehicle body, has a hollow frame body comprised by a plurality of deflectors, each of which is shown as an arc configuration, and between two of which an airflow channel is formed. An air inlet and an air outlet, both of which are communicated by the airflow channel, are respectively formed at the front side and the rear side of the frame body. When the vehicle is running, the generated airflow enters the frame body through the air inlet, then guided forcedly along the airflow channel, and finally flows out of the air outlet to form an invisible wall, whereby the size of the eddy zone behind the vehicle body is reduced, the airflow flows more smoothly, and the running efficiency is boosted.

However, according to the prior art mentioned above, the diversion structure is arranged at the tail end of the vehicle with the air outlet designed as a configuration curved inwardly and positioned corresponding to the rear door of a vehicle such as truck, so it will generate blocking problems; for example, the door is uneasy to open or unable to open completely.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve aforementioned problems, the invention is mainly to provide a slippage-typed diversion apparatus for reducing the drag of a running vehicle, in which the movable mechanism can displace a diversion assembly for reducing drag along the tail end of the vehicle body forwardly and backwardly, whereby the hindrance of opening the door leaf of the vehicle by the diversion assembly can be avoided.

Secondly, the invention is to provide a diversion apparatus, adapted by being arranged at the tail end of a vehicle, including a diversion assembly and a slide mechanism. The inside of the diversion assembly is hollow and forms an airflow channel. The slide mechanism is arranged fixedly at the tail end of the vehicle body and has slot tracks extended along the lengthwise direction of the tail end of the vehicle body. The diversion assembly arranged on the slot tracks can be moved and slid thereon. Therefore, the diversion assembly can be slid on the slot tracks and moved toward the front of the vehicle body to prevent the opening of the door leaf of the vehicle from being hindered by the diversion assembly to further achieve the objective mentioned above.

BRIEF DESCRIPTION OF DRAWING

The features of the invention believed to be novel are set forth with particularity in the appended claims. The invention itself, however, may be best understood by reference to the following detailed description, which describes an embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, not used to limit its executing scope. Any equivalent variation and modification made according to appended claims is all covered by the claims claimed by the present invention.

Figure 1:
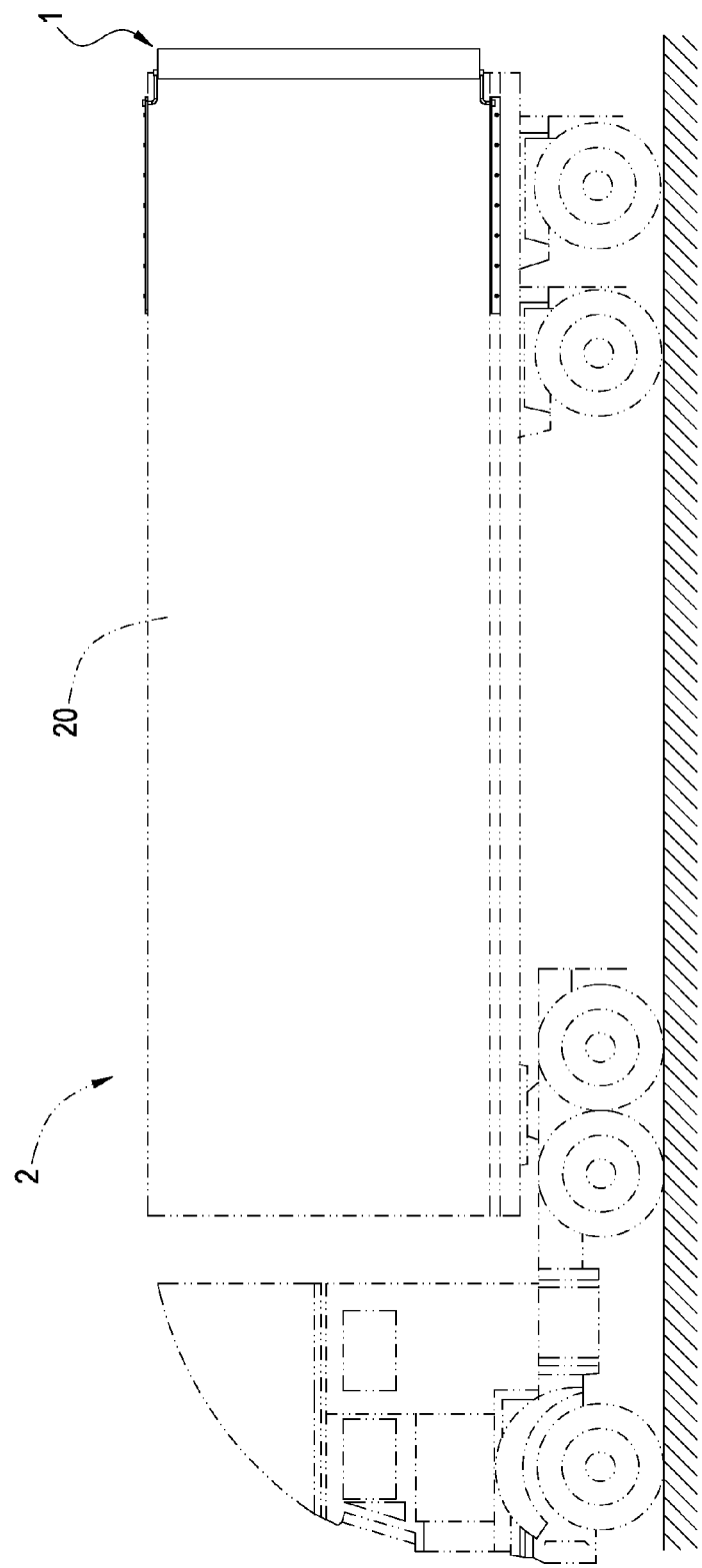
FIG. 1 is an elevation illustration of the invention arranged to a vehicle.
Figure 2:
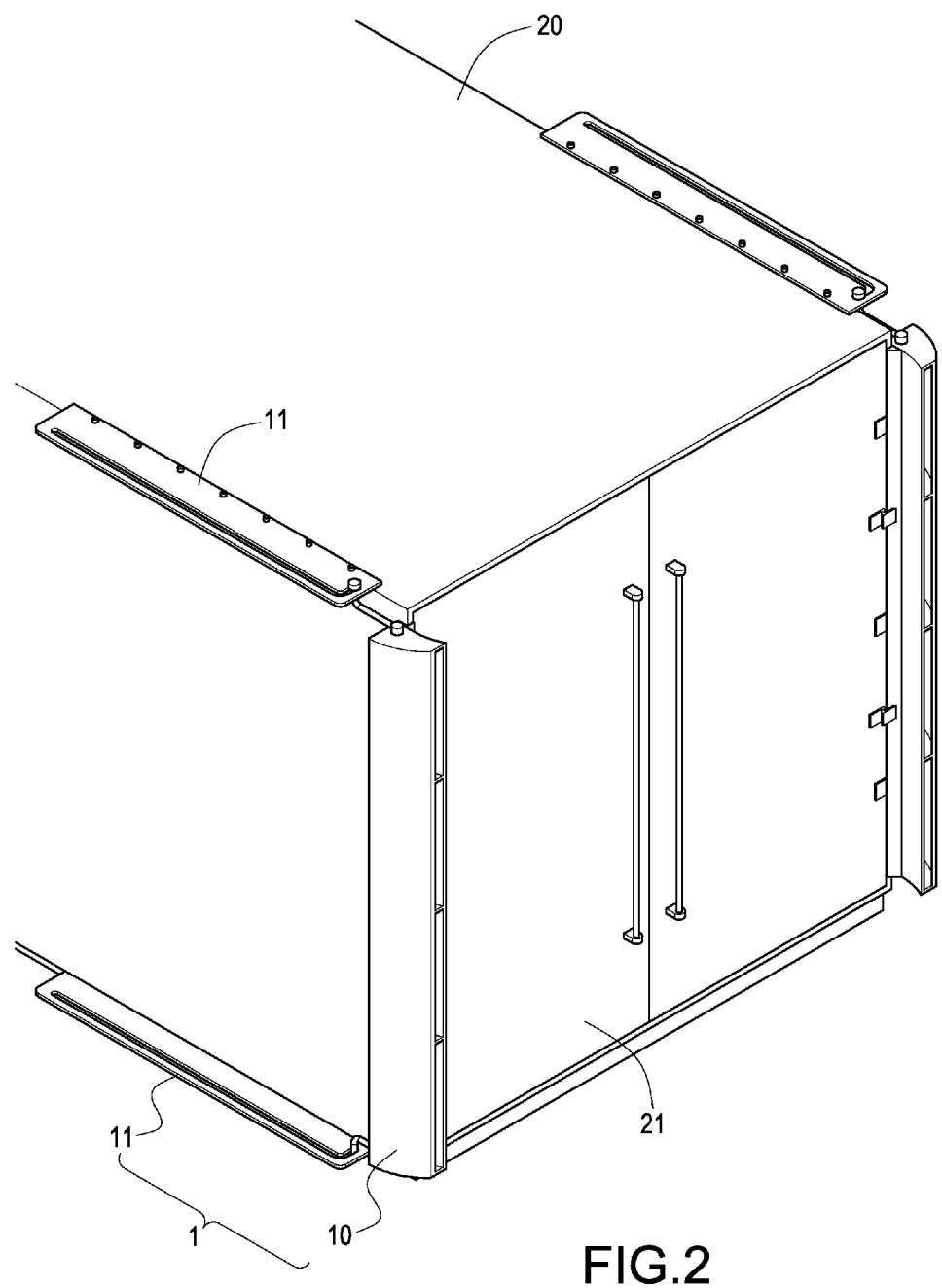
FIG. 2 is a partial perspective illustration of the invention arranged at the tail end of a vehicle.

Please refer to FIG. 1 and FIG. 2, which respectively are an illustration of the invention arranged to a vehicle and a partial perspective illustration of the invention arranged at the tail end of a vehicle. The invention is to provide a sliding diversion apparatus for reducing drag of vehicle. The diversion apparatus 1 is adapted by being arranged at the tail end of a vehicle body 2. In the embodiment proposed by the invention, the diversion apparatus 1 is arranged at the tail end of a vehicle's container 20 such as of a truck by corresponding to two sides of the door leaves 21 behind the container 20. The diversion apparatus 1 includes a diversion assembly 10 and a slide mechanism 11.

Figure 3:
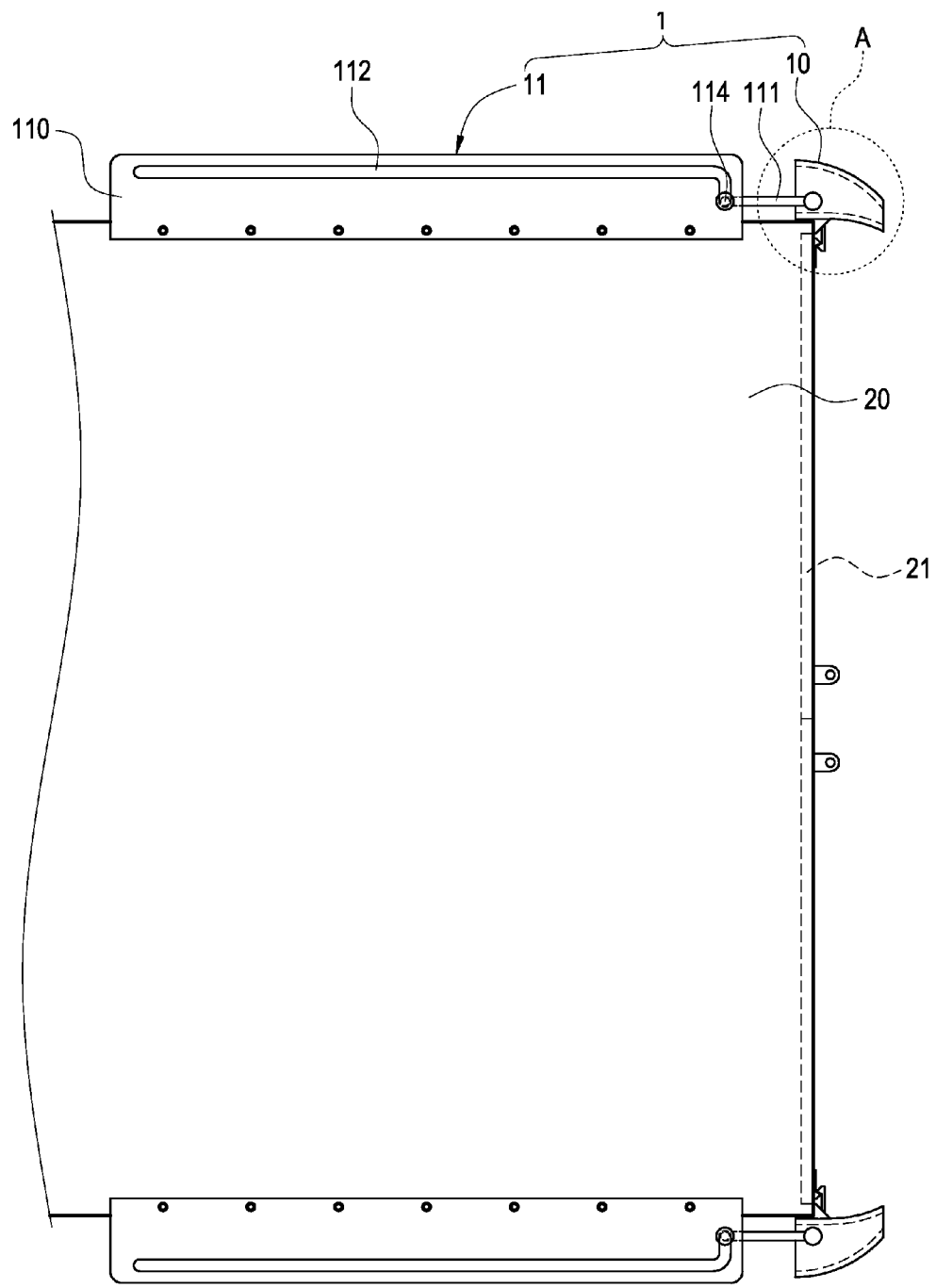
FIG. 3 is a partial plan illustration of the invention arranged at the tail end of a vehicle.
Figure 4:
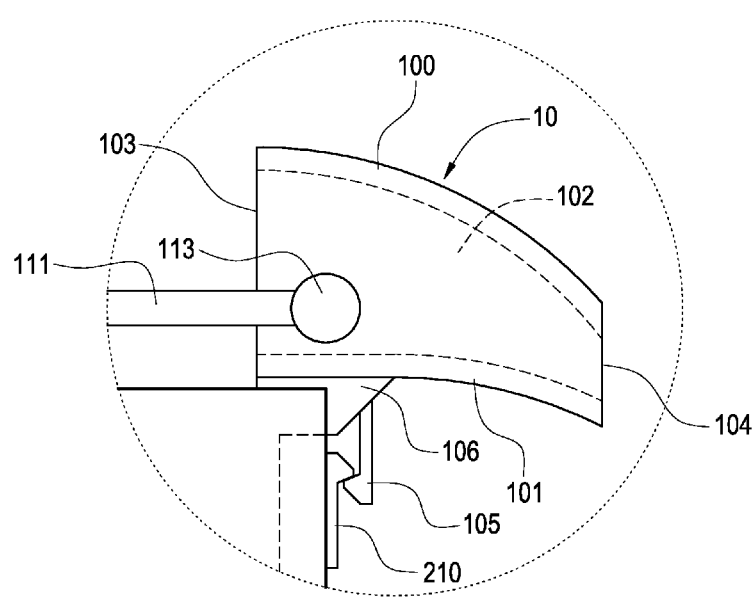
FIG. 4 is a an enlarged view of circle "A" in FIG. 3.

As shown in FIG. 3 and FIG. 4, the diversion assembly 10 is mainly a long frame body shown as a hollow configuration, an outside and an inside of which respectively have an outer deflector 100 and an inner deflector 101, between which an airflow channel 102 is formed, and each of which is shown as an arc configuration. In addition, an air inlet 103 and an air outlet 104 are respectively formed at a front side and a rear side of the airflow channel 102 of the diversion assembly 10.

Following the preceding description, the slide mechanism 11 is provided for fixing the diversion assembly 10 at two sides of the tail end of the vehicle body 2 and for the diversion assembly 10 to be slid thereon. In this preferable embodiment of the invention, the slide mechanism 11 includes two track seats 110 interspaced to each other and two slide rods 111 connecting the diversion assembly 10 onto the two track seats 110. The two track seats 110 are respectively arranged at an upper side and a lower side of one lateral surface at the tail end of the vehicle body 2 and shown as an interspaced arrangement. Two slot tracks 112 extended along the lengthwise direction of the tail end of the vehicle body 2 are respectively arranged onto the two track seats 110. Each slide rod 111 has a connection end 113 assembled to one side of the diversion assembly 10 and a slide end 114 movably arranged in the slot track 112. The two slide rods 111 can bring along the diversion assembly 10 to slid on the slot tracks 112. During activation, the diversion assembly 10 can be moved from the tail end of the vehicle body 2 toward the front direction along the slot tracks 112.

In addition, as shown in FIG. 4, the diversion assembly 10 is arranged a first fastener 105 at the outside of the inner deflector 101. On the other hand, a second fastener 210 is arranged correspondingly at the outside of the door leaf 21 of the vehicle. The second fastener 210 and the first fastener 105 are correspondingly inter-buckled to each other, such that the diversion assembly 10 can be fixed at the outside of the door leaf 21 when the vehicle is running. Moreover, a buffer pad 106 further arranged at the outside of the inner deflector 101 can be constituted by a soft material with elasticity such as rubber and provided for the first fastener 105 arranged thereon. In this case, the diversion assembly 10 can also be a single long piece body (shown as the configuration of the outer deflector 100 or the inner deflector 101), whereby it can achieve a performance of drag reduction as well. Preferably, the configuration of the diversion assembly 10 is a frame body, which is better than that of a single piece body, in terms of diversion performance.

Therefore, through the constitution of aforementioned assemblies, a sliding diversion apparatus for reducing drag of vehicle according to the invention is thus obtained.

Figure 5:
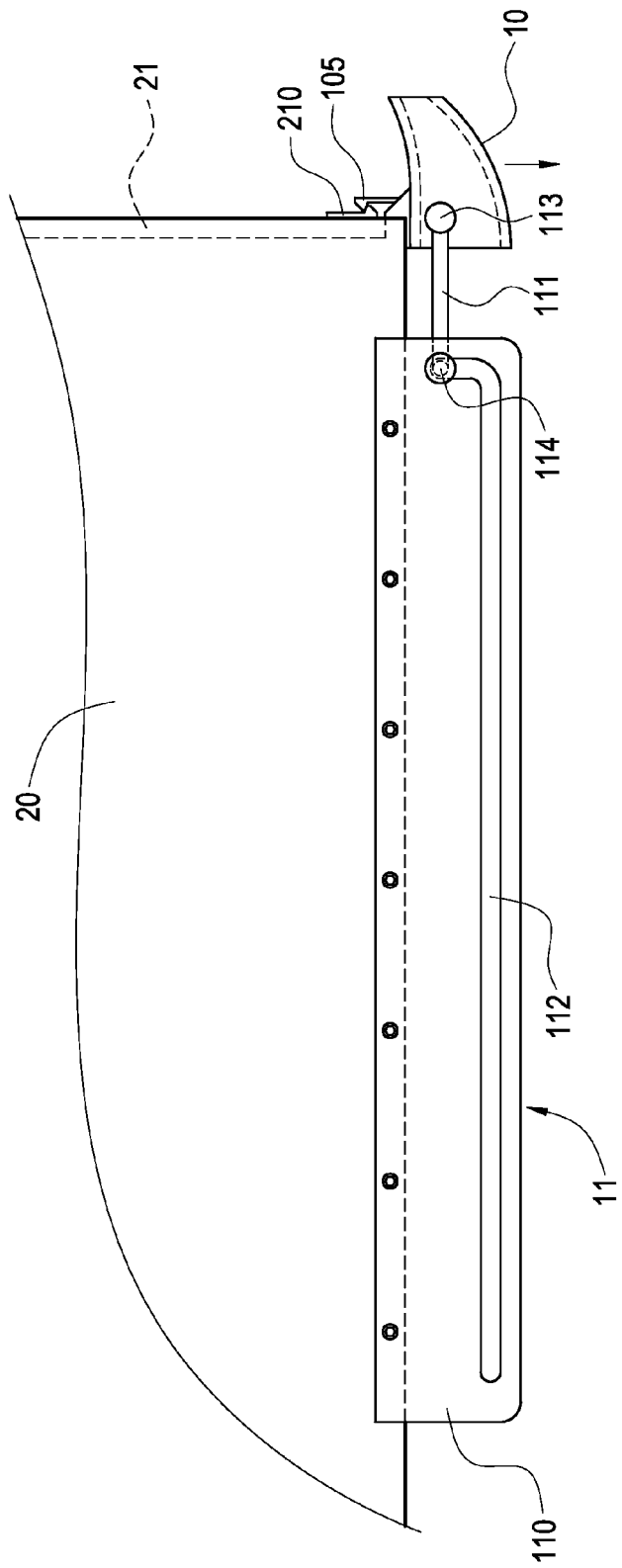
FIG. 5 is a partial plan illustration of the diversion assembly of the invention before the displacement.
Figure 6:
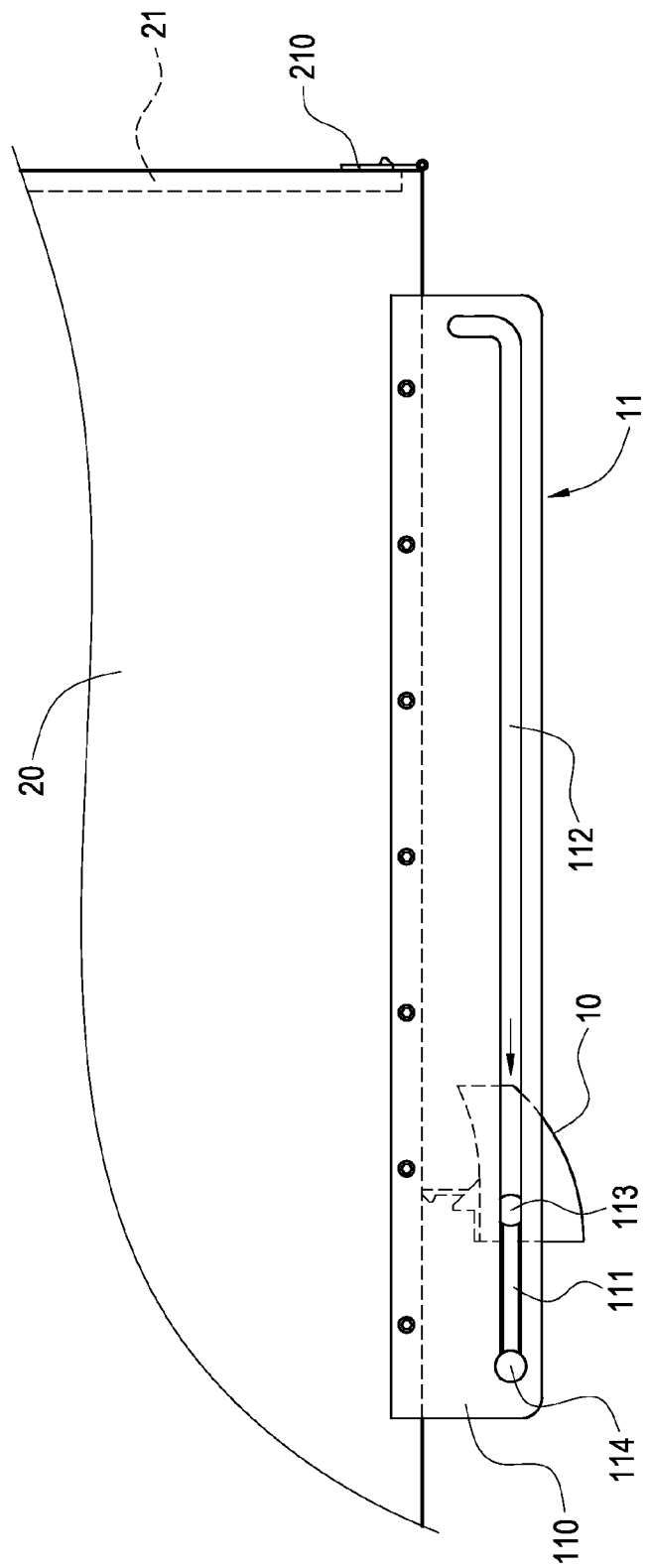
FIG. 6 is a partial plan illustration of the diversion assembly of the invention after the displacement.
Figure 7:
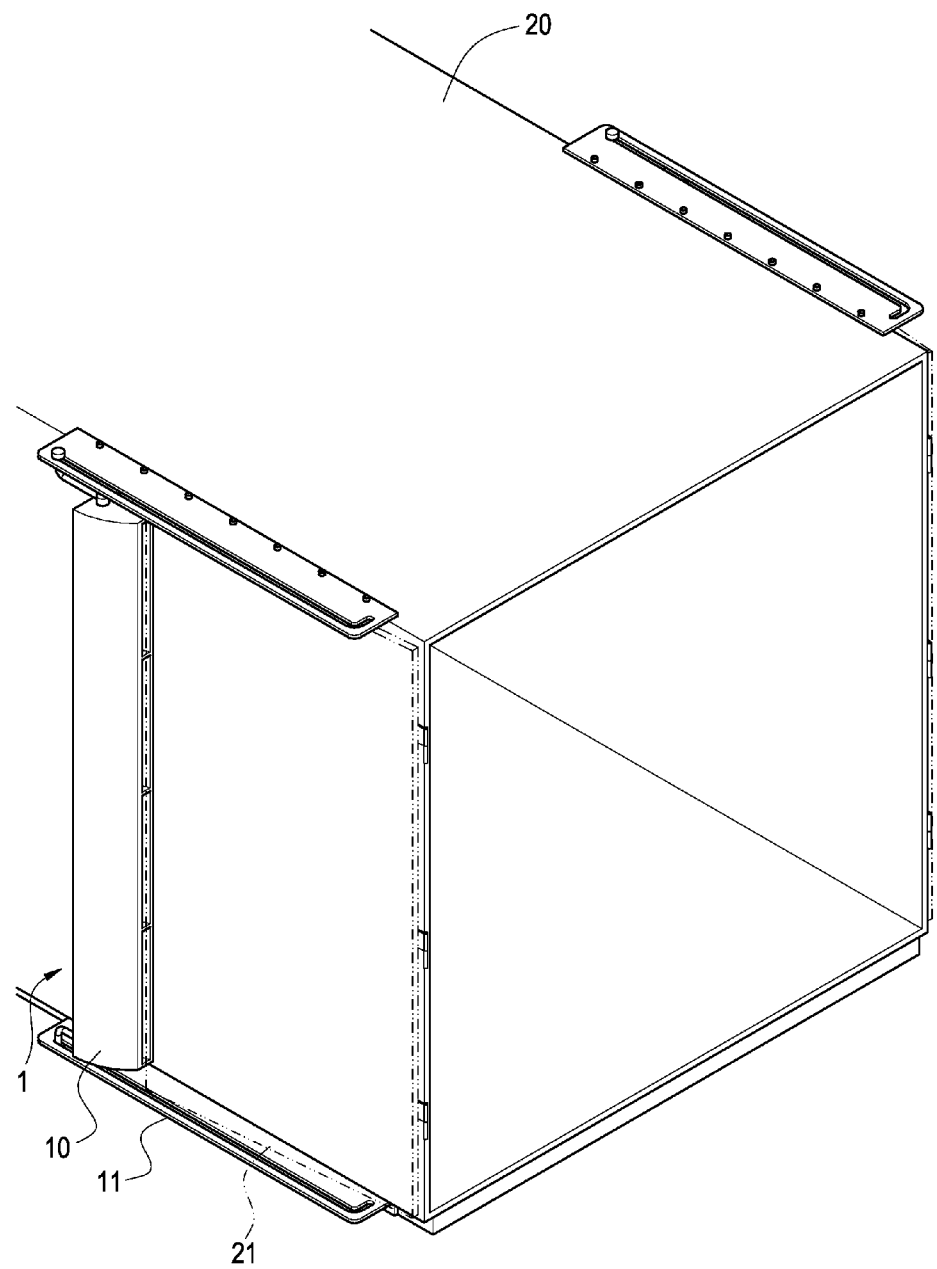
FIG. 7 is a partial perspective illustration of the diversion assembly of the invention after the displacement.

Accordingly, as shown in FIG. 5, when the vehicle is running, the diversion assembly 10 can be positioned fixedly at the outside of the door leaf 21 by inter-buckling the first and second fasteners 105, 210 together, whereby the drag of the running vehicle can be reduced. When the vehicle is stopped and intending to open its door leaf 21, the first and second fasteners 105, 210 inter-buckled between the diversion assembly 10 and the door leaf 21 are first disengaged, then making the diversion assembly 10 moved forwardly along the two slot tracks 112 respectively arranged on the two track seats 110 (as shown in FIG. 6 and FIG. 7), whereby the opening of the rear door leaf 21 of the vehicle 2 won't be hindered by the diversion assembly 10. When intending to drive the vehicle, the diversion assembly 10 is slid again toward the rear end of the slot track 112 and positioned fixedly by inter-buckling the first and second fasteners 105, 210 together again, by which the drag of the vehicle can be reduced when running.

Summarizing aforementioned description, the sliding diversion apparatus of the invention is an indispensable apparatus for reducing the drag of a running vehicle indeed, which may positively reach the expected usage objective for solving the drawbacks of the prior arts, and which extremely possesses the innovation and progressiveness to completely fulfill the applying merits of a new type patent, according to which the invention is thereby applied.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:

1. A sliding diversion apparatus for reducing drag of vehicle, adapted to be arranged at a tail end of a vehicle body (2), the apparatus comprising:
   a diversion assembly (10), an inside of which is hollow and forms an airflow channel (102); and
   a slide mechanism (11), which is arranged fixedly at the tail end of the vehicle body (2), and which has slot tracks (112) extended along a lengthwise direction of the tail end of the vehicle body (2), the diversion assembly (10) arranged on the slot tracks (112) being able to be moved and slid thereon,
   wherein the diversion assembly (10) is a frame body, an outside and an inside of which respectively have an outer deflector (100) and an inner deflector (101), between which the airflow channel (102) is formed, and
   wherein the diversion assembly (10) is arranged a first fastener (105) at an outside of the inner deflector (101), and a second fastener (210) arranged correspondingly to the vehicle body (2) is inter-buckled correspondingly with the first fastener (105) together.

2. The sliding diversion apparatus for reducing drag of vehicle according to claim 1, wherein the diversion assembly (10) is arranged a buffer pad (106) at the outside of the inner deflector (101).

3. The sliding diversion apparatus for reducing drag of vehicle according to claim 1, wherein the outer and inner deflectors (100, 101) are respectively shown as an arc configuration.

4. The sliding diversion apparatus for reducing drag of vehicle according to claim 1, wherein the airflow channel (102) includes an air inlet (103) and an air outlet (104) respectively at a front side and a rear side of the diversion assembly (10).

5. The sliding diversion apparatus for reducing drag of vehicle according to claim 1, wherein the diversion assembly (10) is a long piece body shown as an arc configuration.

6. The sliding diversion apparatus for reducing drag of vehicle according to claim 1, wherein the slide mechanism (11) further includes two track seats (110) arranged by inter-spaced to each other and two slide rods (111) connecting the diversion assembly (10) onto the two track seats (110), and the slot tracks (112) are respectively located on the two track seats (110), and the slip rods (111) all have a connection end (113) assembled to one side of the diversion assembly (10) and a slide end (114) movably arranged in the slot track (112).

7. The sliding diversion apparatus for reducing drag of vehicle according to claim 6, wherein the two track seats (110) are respectively arranged at an upper side and a lower side of one lateral surface at the tail end of the vehicle body (2).

* * * * *